United States Patent
McCague

(10) Patent No.: US 9,493,369 B2
(45) Date of Patent: *Nov. 15, 2016

(54) DROP-IN CHLORINATOR FOR PORTABLE SPAS

(71) Applicant: Watkins Manufacturing Corporation, Vista, CA (US)

(72) Inventor: Michael McCague, Escondido, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,366

(22) Filed: Jan. 11, 2016

(65) Prior Publication Data

US 2016/0123031 A1 May 5, 2016

Related U.S. Application Data

(60) Division of application No. 14/815,579, filed on Jul. 31, 2015, now Pat. No. 9,403,700, which is a continuation of application No. 14/262,576, filed on Apr. 25, 2014, which is a continuation of application No. 13/570,658, filed on Aug. 9, 2012, now Pat. No. 8,745,774, which is a continuation of application No. 12/504,491, filed on Jul. 16, 2009, now Pat. No. 8,266,736.

(51) Int. Cl.
| | |
|---|---|
| *E04H 4/00* | (2006.01) |
| *C02F 1/467* | (2006.01) |
| *E04H 4/12* | (2006.01) |
| *C02F 1/461* | (2006.01) |
| *C02F 103/42* | (2006.01) |

(52) U.S. Cl.
CPC ........... *C02F 1/4672* (2013.01); *C02F 1/4674* (2013.01); *E04H 4/0018* (2013.01); *E04H 4/1209* (2013.01); *E04H 4/1281* (2013.01); *C02F 2001/46142* (2013.01); *C02F 2103/42* (2013.01); *C02F 2201/461* (2013.01); *C02F 2201/4617* (2013.01); *C02F 2209/05* (2013.01)

(58) Field of Classification Search
CPC ..... E04H 4/14; E04H 4/1209; E04H 4/1218; C02F 1/463; C02F 4/4674; C02F 4/467
USPC .................................................. 4/490, 496
See application file for complete search history.

(56) References Cited

U.S. PATENT DOCUMENTS

| | | | | |
|---|---|---|---|---|
| 4,781,805 A * | 11/1988 | Dahlgren | .............. | C02F 1/4606 205/701 |
| 5,324,398 A * | 6/1994 | Erickson | ................. | C02F 1/008 204/228.6 |
| 5,328,584 A * | 7/1994 | Erickson | ................ | B01D 17/06 204/228.3 |
| 6,821,398 B2 * | 11/2004 | Von Broembsen | ... | C02F 1/4674 204/269 |
| 8,266,736 B2 * | 9/2012 | McCague | .............. | C02F 1/4674 4/496 |
| 8,273,254 B2 * | 9/2012 | McCague | .............. | C02F 1/4674 204/155 |
| 2006/0249400 A1* | 11/2006 | Bremauer | ............. | C02F 1/4674 205/743 |

* cited by examiner

*Primary Examiner* — Huyen Le
(74) *Attorney, Agent, or Firm* — Lappla Ubell IP Law, LLP; Franklin D. Ubell

(57) ABSTRACT

An oxidizer generating apparatus comprising a cylindrical housing and an electrode assembly attached at one end of the housing comprising at least three vertically disposed electrodes, the electrodes being spaced apart so as to define a water flow path between them, the electrodes comprising titanium outer electrodes and at least one inner diamond electrode.

19 Claims, 7 Drawing Sheets

DROP-IN CHLORINATOR FOR PORTABLE SPAS

PRIORITY CLAIM TO EARLIER FILED APPLICATIONS

The subject application is a divisional application of application Ser. No. 14/815,579, filed Jul. 31, 2015, which is a continuation of application Ser. No. 14/262,576, filed on Apr. 25, 2014, which is a continuation of application Ser. No. 13/570,658, filed on Aug. 8, 2012 and issued as U.S. Pat. No. 8,745,774 on Jun. 10, 2014, which is a continuation of application Ser. No. 12/504,49, filed on Jul. 16, 2009 and issued as U.S. Pat. No. 8,266,736 on Sep. 18, 2012, and the benefit of these earlier filing dates are claimed and the content of each of the earlier filed applications is incorporated herein by reference as though fully set forth herein.

FIELD OF INVENTION

This disclosure relates to water purification particularly with respect to water containing vessels such as spas, hot tubs, whirlpools, pools and the like and to a chlorinator or oxidizer generator suitable for such purpose.

RELATED ART

Portable spas have become quite popular as a result of their ease of use and multiplicity of features such as varied jet and seating configurations. Maintaining appropriate water chemistry and sanitation is of course important to enhancing the spa user experience.

SUMMARY

The following is a summary of various features, aspects, and advantages realizable according to various illustrative embodiments of the invention. It is provided as an introduction to assist those skilled in the art to more rapidly assimilate the detailed discussion which ensues and does not and is not intended in any way to limit the scope of the claims which are appended hereto in order to particularly point out the invention.

An illustrative embodiment of a portable spa drop-in chlorinator includes a housing having an inlet at a first end, wherein an electrode assembly is mounted so that spa waters flows through the electrodes and out of a second end of the device. When an appropriate voltage is applied, the electrodes interact with the fluid within the chlorinator to generate various oxidizing agents. In one embodiment, the chlorinator is cylindrical and is sized to fit within the central opening of a filter element located in a filter compartment of a portable spa.

In one embodiment, respective outer electrodes comprise titanium, while inner electrodes comprise doped diamond particles embedded in a plastic mesh substrate. In other illustrative embodiments, the doped diamond surface comprises the surface of a whole diamond electrode. In other illustrative embodiments, the diamond coated substrate may be selected from one of the group including titanium, niobium, silicon, platinum, or stainless steel. The electrodes may be solid metal plates or a mesh, the latter providing increased surface area.

DETAILED DESCRIPTION

Figure 1:
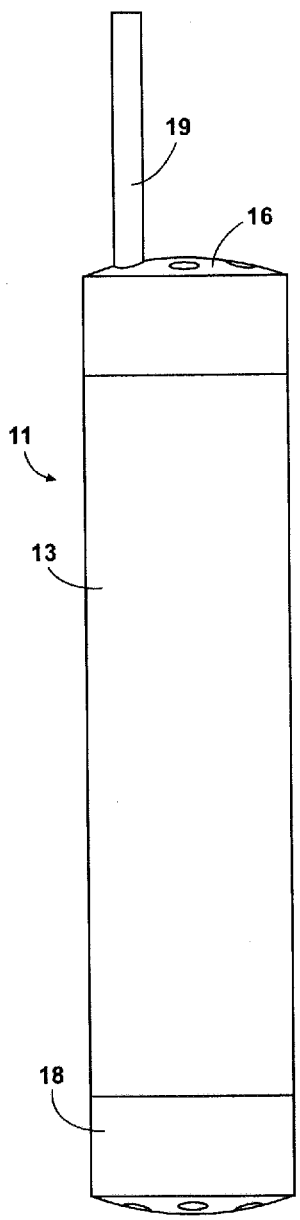
FIG. 1 is a side view of a drop-in chlorinator according to an illustrative embodiment.
Figure 2:
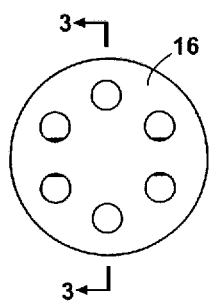
FIG. 2 is a top view of the chlorinator of FIG. 1.
Figure 3:
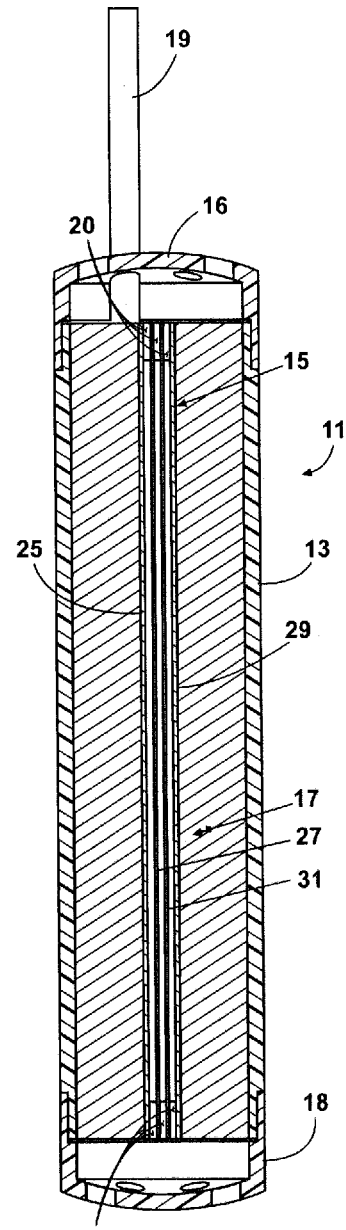
FIG. 3 is a sectional view of the chlorinator of FIG. 1 taken at 3-3 of FIG. 1.

FIGS. 1-3 depict an illustrative embodiment of a compact drop-in chlorinator 11. The chlorinator 11 has a cylindrical housing 13. An electrode assembly 15 comprising electrodes 25, 27, 29, 31 is disposed vertically through the interior of the housing 13 and retained in the housing 13, for example, by surrounding epoxy potting compound 17. In an illustrative embodiment, epoxy 17 fills the interior of the cylinder 13 except for the space occupied by the electrode assembly. An electrical cable 19 supplies the device 11 with power and is also encapsulated by the epoxy potting compound 17. Respective end caps 16, 18 enclose the opposite ends of the housing 13 and assist in shielding the electrode assembly 15 from foreign matter, and are optional in various embodiments.

Figure 5:
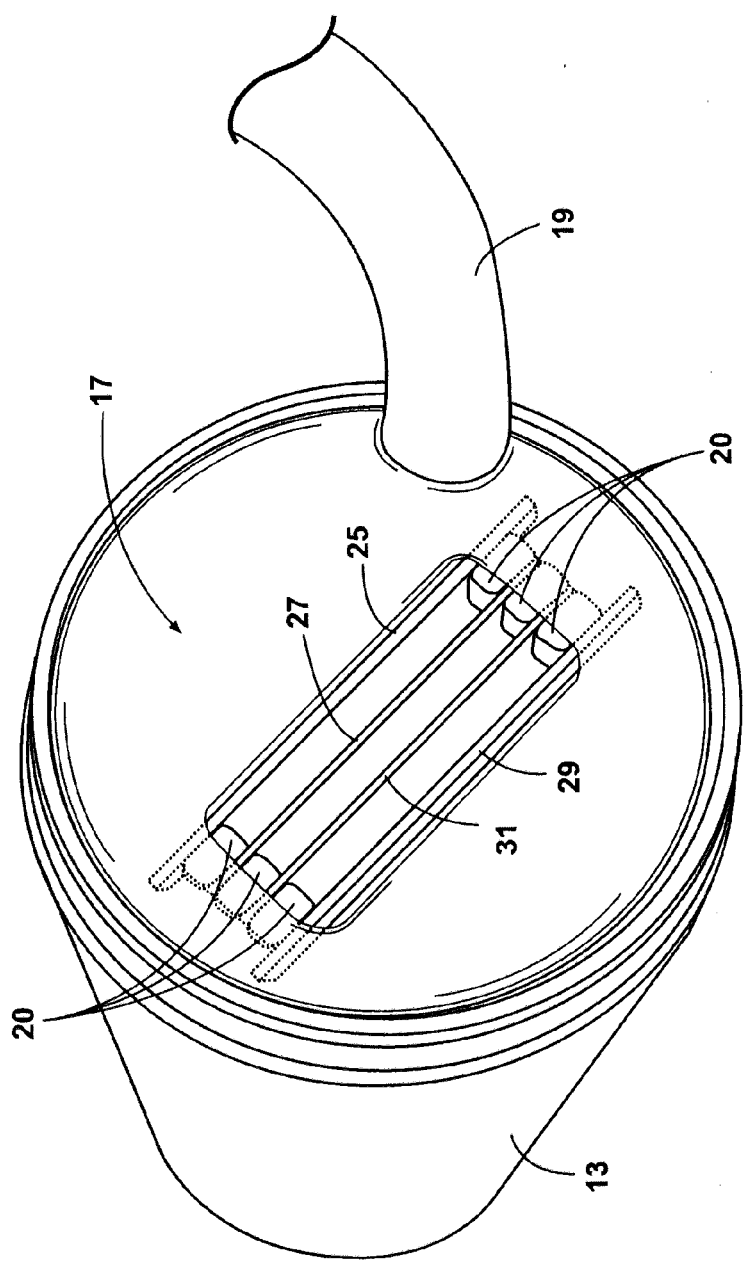
FIG. 5 is a top end perspective view of a drop-in chlorinator illustrating an electrode assembly according to FIG. 4 encapsulated in the device.

In one embodiment, spacers 20 may be used to space the electrodes apart. As seen in FIG. 5, the epoxy potting may overlap the spacers 20 and edges of the electrodes 25, 27, 29, 31 to hold the assembly 15 in position.

Figure 4:
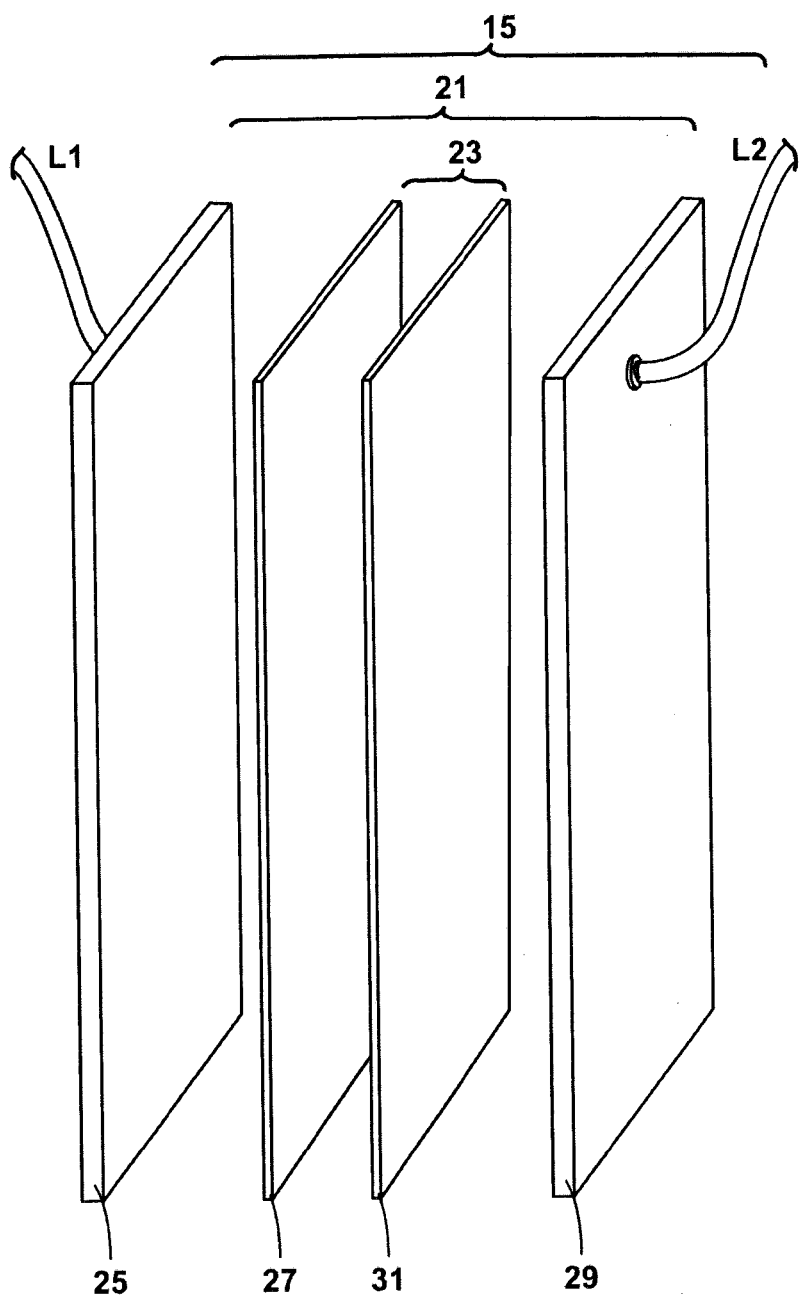
FIG. 4 is a schematic perspective view of an illustrative electrode assembly embodiment.

As illustrated in FIG. 4, the electrode assembly 15 comprises a pair of outer electrodes and a number of inner electrodes. In the illustrative embodiment of FIGS. 1-4, an outer electrode pair 21 and two inner electrodes 23 are provided. In this embodiment, the outer electrode pair 21 comprises a pair of rectangular titanium electrodes 25 and 29, while the inner electrodes 23 comprise rectangular diamond electrodes 27 and 31. Electrical leads $L_1$, $L_2$ emanating from the cable 19 are welded or otherwise electrically connected to the respective titanium electrodes 25, 29. The inner electrodes 27, 31 float electrically, i.e., are not connected to ground. Additional inner electrodes, for example, up to twenty, may be provided in alternate embodiments.

In one embodiment, the titanium electrodes 25, 29 comprise titanium coated with ruthenium iridium. The diamond electrodes 27, 31 may comprise 0.250 micron boron doped diamond crystals embedded in a teflon sheet (plastic matrix) such that diamond protrudes from each side of the sheet. The plastic matrix can be polytetrafluoroethylene (PTFE), polyvinylidene fluoride (PVDF), polyethylene, polypropylene or other suitable materials. In alternate embodiments, the diamond electrodes can comprise either a coating on a substrate or whole diamond designed to be self supporting.

Figure 6:
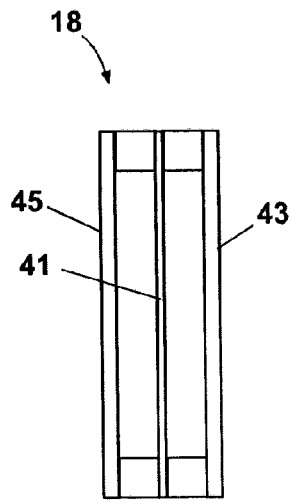
FIG. 6 is a top view of a second electrode assembly embodiment.
Figure 7:
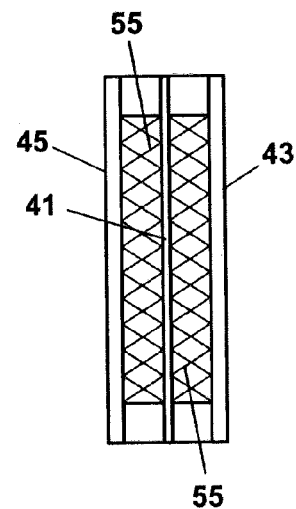
FIG. 7 is a top schematic view illustrating one implementation of the electrode assembly of FIG. 6.
Figure 8:
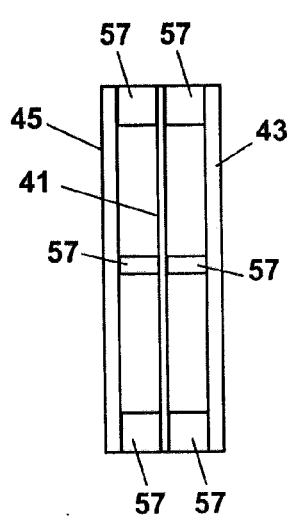
FIG. 8 is a top schematic view illustrating a second implementation of the electrode assembly of FIG. 6.
Figure 9:
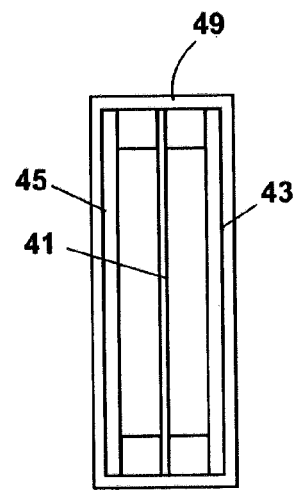
FIG. 9 illustrates one method of fabricating the assembly of FIG. 6.

In a second electrode assembly embodiment 18 shown in FIG. 6, a single central rectangular diamond electrode 41 is positioned between respective titanium outer electrodes 43, 45. In one embodiment illustrated in FIG. 9, the electrode assembly 18 of FIG. 4 is tightly wrapped in a solid plastic film or tape 49 to keep the epoxy potting material out of the assembly 18 during fabrication. Again, the electrodes 41, 43, 45 may be separated and positioned by nonconductive, e.g. plastic mesh spacers 55 (FIG. 7) or individual plastic spacers 57 (FIG. 8). The central diamond electrode 41 floats electrically, i.e., is not connected to ground. The ends of the plate electrodes 43, 43 may be passivated, e.g., ruthenium iridium coated to avoid corrosion and calcium scale.

Figure 10:
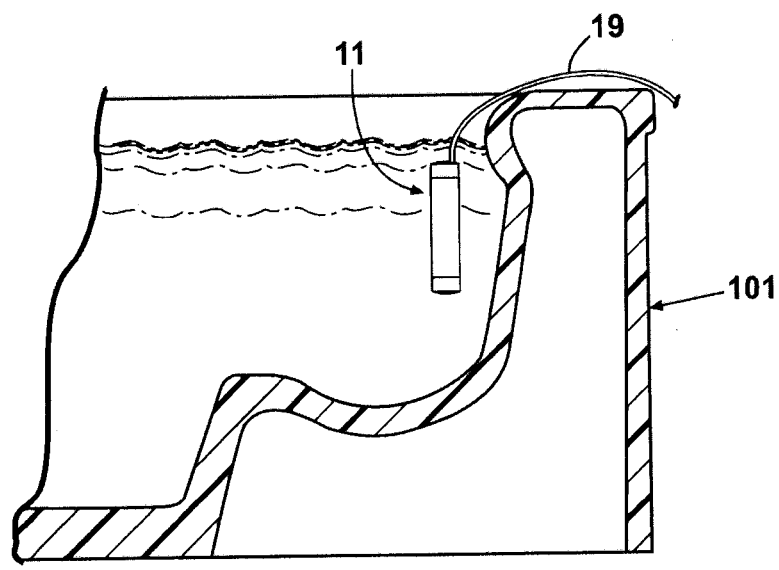
FIGS. 10-12 are side schematic views illustrating various applications of chlorinators according to the illustrative embodiments.
Figure 11:
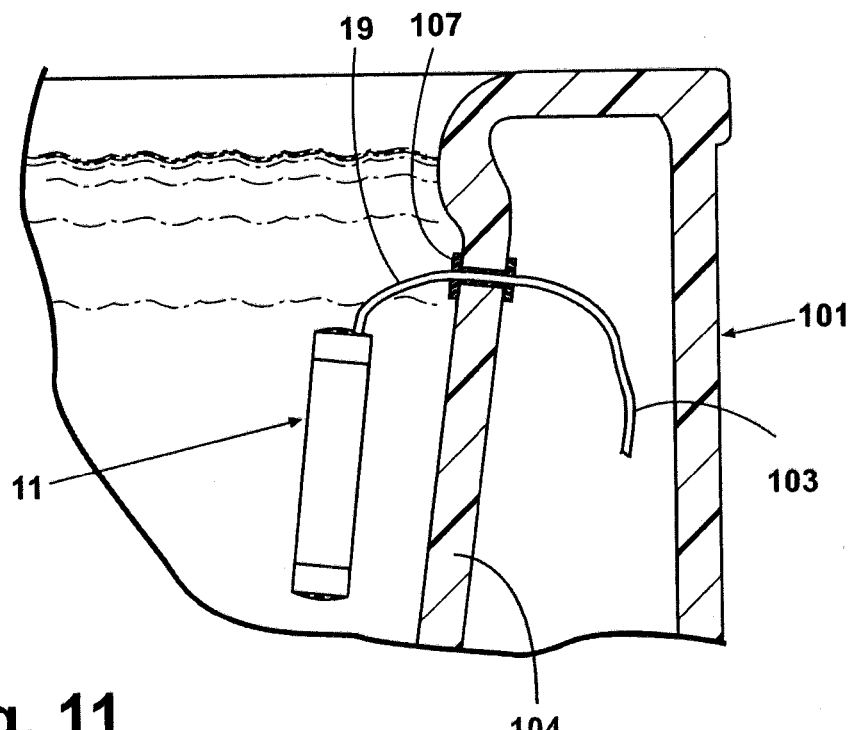
Figure 12:
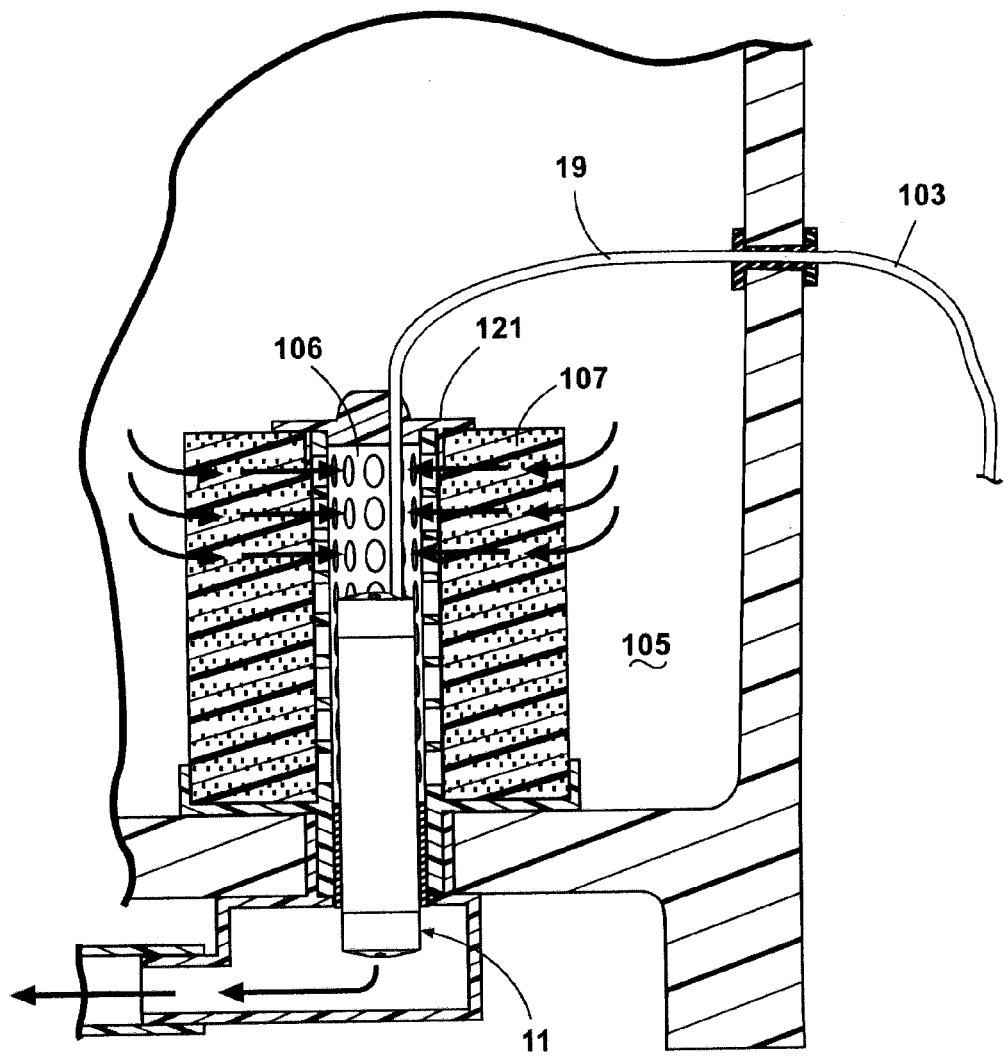

Illustrative uses of a drop-in chlorinator are shown in FIGS. 10-12. FIG. 10 shows an "over the bar top" application where the electrode cable 19 extends over the top edge of the spa 101 and suspends the chlorinator 11 in a floating position in the spa water.

FIG. 11 illustrates an embodiment wherein the electrical cable 19 passes through a pass through seal 107 in the sidewall 104 of the spa 101 into the spa tub or filter compartment, suspending the chlorinator 11 in one of those areas. The "dry" side 103 of the cable 19 may be located in the electrical equipment area of the spa 101 where it may interface with the spa controller circuitry as hereafter described in more detail In the embodiment of FIG. 12, the electrical cable 19 enters the filter compartment 105 and is dropped down the central cylindrical opening 106 of a filter element 107. In this position, spa water is pulled through the electrode assembly, e.g. 15, of the unit 11 by the pump of the spa water circulation system. Thus, the diameter of the cylindrical chlorinator 11 is selected to fit down the internal pipe of the filter element 107. The chlorinator 11 may of course be located elsewhere in the circulation path of the spa. While a snug fit between the chlorinator 11 and internal filter pipe is shown in FIG. 12, a looser fit is preferred, for example, providing a difference of 0.25 inches between the respective diameters of the two parts. In one illustrative embodiment, the drop-in chlorinator may be 1.3 inches in diameter and six inches in length or otherwise properly sized to fit down a filter stand pipe.

Figure 13:
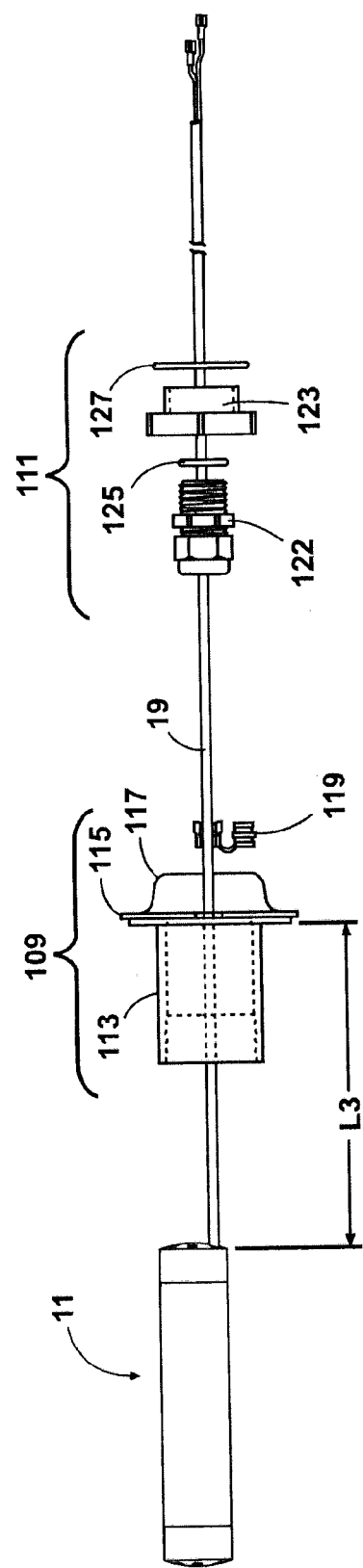
FIG. 13 is a side exploded view of a drop-in chlorinator assembly useful in the application of FIG. 12.

A drop-in chlorinator assembly particularly useful in the embodiment of FIG. 12 is illustrated in FIG. 13. That assembly includes a chlorinator 11, a stand pipe cap assembly 109, and a pass through assembly 111. The diameter of the pipe section 113 of the cap assembly 109 is selected such that it fits snugly into the central cylindrical opening in the filter element 107, while the diameter of the rim 115 of the cap portion 117 is such that it abuts the top surface 121 of the filter element 107. A strain relief device 119 is further provided and, when assembled, is attached to the cable 19 in the interior of the cap assembly 109. The chlorinator 11 is thus suspended with the filter element 107 at a position determined by the length of $L_3$ of the cable 19. The pass through assembly 111 includes a strain relief providing nut 122, a pass through fitting 123 and first and second O-rings 125, 127.

In various alternate embodiments, the electrodes are rectangular in shape and each comprise a boron doped synthetic diamond electrode tailored to flow rate. Such electrodes may be formed, for example, by chemical vapor deposition (CVD) of a very thin coating of boron or nitrogen doped diamond onto a niobium substrate. Such electrodes may be fabricated, for example, by Adamant, Chauxde-Fords, Switzerland. Other substrate materials may be used such as titanium, silicon, platinum or stainless steel. Embodiments may also be constructed of self-supporting diamond without using a substrate, such as may be obtained, for example, from Advanced Oxidation, Cornwall, U.K. In various embodiments, the substrates may either be solid plates or mesh, the latter providing increased surface area.

In operation of illustrative embodiments in an illustrative portable spa environment, a constant current mode of operation of the device 11 may be employed. In such case, a selected current flow through each electrode pair in the range of 1-5 amps, for example, 2 amps, may be used with a floating voltage across the outer electrode pair of 5-24 volts. In such embodiments, flow rates through the cell 11 may range from ½ gallon to 5 gallons per minute. An advantage of the chlorinator according to embodiments above is that it has low salt level requirements (0 ppm to 1000 ppm) vs. typical 3500-5000 ppm. Electronically, a constant current AC/DC transformer supplying 1 to 5 amps at 5 to 24 volts D.C. may be used along with a microcontroller to control activation of the chlorinator 11.

In such embodiments, hydroxyl radicals are generated directly off the electrode plates. The hydroxyl radicals then oxidize organic waste in the process water or react with water and dissolved salts to produce various oxidizers. These include but are not limited to, ozone (O3), hydrogen peroxide (H2O2), sodium hypochlorite (NaHOCl/OCl), chlorine dioxide (ClO2), sodium persulfates (NaHSO5) and sodium percarbonate ($Na_2CO_3$). This broad spectrum of oxidizers is capable of neutralizing organic and other contaminants which may be present.

A chlorine generator system according to an illustrative embodiment may operate in an open-loop mode using scheduled and timed generation of chlorine. The length and interval of daily generation is typically a function of the spa size, bather load, and water salinity. In such a system, the cell 11 may produce a constant stream of 0.1 to 0.60 ppm (parts per million) chlorine in a 4 gpm flow (0.5-2 amp & 1000-2000 ppm salt). To maintain the chlorine level in the water, the cell 11 must operate longer for a large spa than for a small spa. Additionally the cell 11 must run longer with a higher expected bather load. The salt level has a strong direct relationship to the quantity of chlorine produced.

In an illustrative open loop system the user inputs three variables to the system at start-up. The first is the SPA SIZE or (SPA). A size code may be used (e.g. 1-8). The anticipated USE LEVEL or (USE) (1-5) is the second variable. Use level "(1)" corresponds to minimal use and vacation mode. A higher level should be entered if more bathing is expected. The user preferably adjusts the use level over the course of use. The third start-up variable input is the water hardness (Hd). This parameter controls the polarity reversal cycle timing used to clean the electrodes. This variable may not be employed in alternate embodiments.

As an additional input feature, a manual chlorine addition (Add) or BOOST command may be implemented. This command instructs the system to generate enough chlorine to add 2 ppm to the spa. This chlorine Add temporarily overrides scheduled operation times.

The manual Add or BOOST command dictates that the system run for a length of time sufficient to add 2 ppm Chlorine. The amount of time needed to bring the water to 2 ppm is highly dependent on the amount of bather load in the water. A standard 24 hour dose or longer may be needed to completely bring the water up. In one implementation of the Add or BOOST command, the system switches from 2 amps to 4-4.5 amps to rapidly generate chlorine. One run cycle every six hours may be used to maintain uniform around the clock treatment.

In one embodiment, salt is measured each time the unit 11 generates chlorine as well as when requested by the user. The system measures the salt level of the water by means of measuring the voltage and current across the cell 11. The voltage reading is then compared against allowable limits. The salt concentration is normalized, and displayed on the user interface. A voltage higher or current lower than specified returns a low salt error and a voltage less or current higher than specified returns a high salt error.

If there is a low salt condition, an error may be sent to the spa controls, triggering a "water care" icon to flash. The unit 11 may be allowed to continue to generate chlorine in this condition. The spa controls or controller modulates available voltage or current to a regulated limit to automatically compensate for low salt or conductivity situations. If there is a high salt condition, an error will be sent to the spa controls, again triggering the water care icon to flash. In this case, the unit 11 will not generate chlorine until the salt level has been corrected.

To prevent mineral scale on the electrodes 53, 55, 57, 59, polarity reversal may be used. The time period of the reversal is a function of water hardness and is preferably made adjustable to a user input hardness reading. Rapid cycling of the electrodes will cause premature electrode failure. Therefore a dead band in the cycle may be implemented to allow the electrodes to discharge prior to the polarity reversal. The dead band interval may be, for example, a minimum of 10-20 seconds.

At either initial start-up or at a maintenance event, the spa water should be manually balanced. Once the spa water has been balanced it should be super chlorinated (5 ppm). Super chlorination prepares the system for operation and immediate spa usage by cleaning the spa after a period of nonuse. After super chlorination, salt is added to the water. The spa control system may operate such that the water care icon is blinking to indicate that the salt level is low and/or the unit has not been initialized or programmed. Salt should be added slowly into the filter compartment while all of the jets are operating. The jets should operate an additional 10 minutes after the salt is fully added. An example of a target salt concentration is 1000 ppm. High demand users can add up to 2000 ppm salt, which will lower the hours required to generate chlorine and therefore lower the USE level. A salt level reading is preferably taken every time the unit begins a generation cycle to ensure proper salt levels at start-up and during the time between water changes.

Typical operation of an illustrative system preferably requires a weekly chlorine and water quality check to ensure that the system is working correctly. Although the user is not required to enter the chlorine concentration, the value is needed to determine the use level. Over the course of the first month, the user may determine their Use Level by taking a reading of the water before they enter the spa. If the chorine level is low, e.g., "1" or less, the user will want to increase the use level by one to increase the output. If the user finds that the chlorine level is 5 or higher, the user will want to drop the use level by one and retest in a few days or a week. If the bather load is predictable, the use level may only need occasional adjustments.

If the bather load is sporadic, the user may want to perform a manual addition. In such case, the user may enter the spa control menu and confirm an addition (Add or Boost). The addition operation turns the system on immediately and operates the specified amount of time determined to elevate the chlorine level by 2 ppm (this depends on bather load and time and cannot be guaranteed). If the water is overly polluted such that the actual bather load far exceeded the anticipated bather load, a manual dichlor/MPS dose may be used and is compatible with the system.

Typically, the spa will require a monthly manual shock with MPS or dichlor to eliminate any accumulated waste. The oxidizer level should be brought to and held at 5 ppm while all jets configurations and pumps are operated for 30 minutes each. It is important to monitor pH at this time as well to ensure that the water remains balanced.

Over time the water level in spa typically drops from evaporation or splash out. When fresh water is added to the spa, it is important to rebalance the water and monitor the salt concentration. The system may employ a conductivity sensor to determine the amount of salt in the water and whether it is too high or too low. A water care icon may be arranged to blink to indicate that the salt is low and that more salt is needed. Salt should be added in 0.25 lb (100 g) increments to ensure that it is not over dosed.

While the apparatus and method have been described in terms of what are presently considered to be the most practical and preferred embodiments, it is to be understood that the disclosure is not limited to the disclosed embodiments. It is intended to cover various modifications and similar arrangements included within the spirit and scope of the appended claims.

What is claimed is:

1. An apparatus comprising:
   a chlorine generating device comprising a housing sized to fit within a central opening of a portable spa filter, and an electrode assembly positioned within the housing comprising a plurality of vertically disposed electrodes, the electrodes being spaced apart from one another; and
   an electrical cable extending out of said housing and having a length selected to position said housing in said central opening and to extend to an interior surface of a portable spa.

2. The apparatus of claim 1 wherein the length of said electrical cable is selected to extend to an interior surface of a portable spa, through that interior surface, and into an equipment area of the portable spa.

3. The apparatus of claim 2 wherein said electrodes are configured to interact with fluid flowing through said housing to generate a plurality of hydroxyl radicals.

4. The apparatus of claim 1 wherein said electrodes are configured to interact with fluid flowing through said housing to generate one or more hydroxyl radicals.

5. The apparatus of claim 1 wherein said housing is 1.3 inches in diameter and six inches in length.

6. The apparatus of claim 5 wherein the length of said electrical cable is selected to extend to an interior surface of a portable spa, through that interior surface, and into an equipment area of said spa.

7. A chlorinator assembly comprising:
   a housing sized to fit within a central opening of a portable spa filter;
   an electrode assembly positioned within the housing comprising a plurality of vertically disposed electrodes, the electrodes being spaced apart from one another;
   a cap configured to close a said central opening, the cap having a rim and a cylindrical pipe section extending below the rim; and
   an electrical cable extending out of said housing and passing through said cap, the electrical cable having a length selected to position said housing in a said central opening and to extend to an interior surface of a portable spa.

8. The assembly of claim 7 wherein the length of said electrical cable is selected to extend to an interior surface of a portable spa, through that interior surface and into an equipment area of the portable spa.

9. The assembly of claim 8 wherein said electrodes are configured to interact with fluid flowing through said housing to generate a plurality of hydroxyl radicals.

10. The assembly of claim 7 wherein said electrodes are configured to interact with fluid flowing through said housing to generate one or more hydroxyl radicals.

11. The assembly of claim 7 wherein said housing is 1.3 inches in diameter and six inches in length.

12. The assembly of claim 7 wherein said interior surface is an inner wall of a portable spa.

13. The assembly of claim 7 wherein said cap has a circular rim, the rim having a larger outer diameter than an outer diameter of said cylindrical pipe section.

14. An apparatus comprising:
a chlorine generating device comprising a housing sized to fit within a central opening of a portable spa filter, and an electrode assembly positioned within the housing comprising a plurality of vertically disposed electrodes, the electrodes being spaced apart from one another;
a cap configured to close a said central opening, the cap having a rim and a cylindrical pipe section extending below the rim; and
an electrical cable extending out of said housing and passing through said cap, the electrical cable having a length selected to position said housing in a said central opening and to extend to an interior surface of a portable spa.

15. The apparatus of claim 14 wherein the length of said electrical cable is selected to extend to an interior surface of a portable spa, through that interior surface and into an equipment area of the portable spa.

16. The apparatus of claim 15 wherein said electrodes are configured to interact with fluid flowing through said housing to generate a plurality of hydroxyl radicals.

17. The apparatus of claim 14 wherein said electrodes are configured to interact with fluid flowing through said housing to generate one or more hydroxyl radicals.

18. The apparatus of claim 14 wherein said housing is 1.3 inches in diameter and six inches in length.

19. The apparatus of claim 14 wherein said interior surface is an inner wall of a portable spa.

* * * * *